(12) United States Patent
Larcher et al.

(10) Patent No.: US 8,460,626 B2
(45) Date of Patent: Jun. 11, 2013

(54) COMPOSITIONS BASED ON CERIUM OXIDE, ZIRCONIUM OXIDE AND, OPTIONALLY, ANOTHER RARE EARTH OXIDE, HAVING A SPECIFIC RAISED SURFACE AT 1100° C, METHOD FOR THE PRODUCTION AND USE THEREOF AS A CATALYST

(75) Inventors: Olivier Larcher, Perigny (FR); Emmanuel Rohart, Sainte Soulle (FR)

(73) Assignee: Rhodia Electronics and Catalysis, Rochelle (FR)

( * ) Notice: Subject to any disclaimer, the term of this patent is extended or adjusted under 35 U.S.C. 154(b) by 35 days.

(21) Appl. No.: 12/977,236

(22) Filed: Dec. 23, 2010

(65) Prior Publication Data
US 2011/0097252 A1    Apr. 28, 2011

Related U.S. Application Data

(63) Continuation of application No. 10/549,531, filed as application No. PCT/FR2004/000648 on Mar. 17, 2004, now abandoned.

(30) Foreign Application Priority Data

Mar. 18, 2003  (FR) ...................... 03 03292

(51) Int. Cl.
| | |
|---|---|
| *B01J 23/00* | (2006.01) |
| *B01J 31/00* | (2006.01) |
| *B01J 8/02* | (2006.01) |
| *B01D 53/56* | (2006.01) |
| *B01D 53/94* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |

(52) U.S. Cl.
USPC ........ 423/213.2; 502/159; 502/170; 502/302; 502/303; 502/304; 502/349

(58) Field of Classification Search
USPC 502/302, 303, 304, 349, 159, 170; 423/213.2
See application file for complete search history.

(56) References Cited

U.S. PATENT DOCUMENTS

| | | | |
|---|---|---|---|
| 5,529,969 A | 6/1996 | Bonneau et al. | |
| 5,532,198 A | 7/1996 | Chopin et al. | |
| 5,607,892 A | 3/1997 | Chopin et al. | |
| 5,626,826 A | 5/1997 | Chopin et al. | |
| 5,693,299 A | 12/1997 | Chopin et al. | |
| 5,712,218 A | 1/1998 | Chopin et al. | |
| 5,883,037 A * | 3/1999 | Chopin et al. ................ 502/304 |
| 5,908,800 A | 6/1999 | Bonneau et al. | |
| 5,958,827 A | 9/1999 | Suda et al. | |
| 6,040,265 A * | 3/2000 | Nunan .......................... 502/242 |
| 6,051,529 A * | 4/2000 | Brezny .......................... 502/304 |
| 6,107,240 A | 8/2000 | Wu et al. | |
| 6,133,194 A | 10/2000 | Cuif et al. | |
| 6,171,572 B1 | 1/2001 | Aozasa | |
| 6,214,306 B1 * | 4/2001 | Aubert et al. .............. 423/213.2 |
| 6,255,242 B1 | 7/2001 | Umemoto et al. | |
| 6,306,794 B1 | 10/2001 | Suzuki et al. | |
| 6,350,421 B1 * | 2/2002 | Strehlau et al. ............ 423/213.2 |
| 6,506,705 B2 | 1/2003 | Blanchard et al. | |
| 6,528,451 B2 | 3/2003 | Brezny et al. | |
| 6,569,392 B1 | 5/2003 | Li et al. | |
| 6,576,207 B1 * | 6/2003 | Mussmann et al. .......... 423/212 |
| 6,797,668 B2 * | 9/2004 | Yoshikawa .................... 502/304 |
| 7,238,639 B2 * | 7/2007 | Mussmann et al. .......... 502/304 |
| 7,247,597 B2 | 7/2007 | Morikawa et al. | |
| 7,249,597 B2 | 7/2007 | Muller et al. | |
| 2002/0132732 A1 | 9/2002 | Brezny et al. | |
| 2003/0050189 A1 | 3/2003 | Morikawa et al. | |
| 2003/0124035 A1 | 7/2003 | Bert et al. | |

FOREIGN PATENT DOCUMENTS

| | | |
|---|---|---|
| EP | 0 778 071 A1 | 6/1997 |
| EP | 0 955 267 A1 | 11/1999 |
| EP | 1 035 074 A1 | 9/2000 |
| FR | 2 829 129 A1 | 3/2003 |
| JP | 04-055315 A | 2/1992 |
| JP | 04-284847 | 10/1992 |
| WO | WO 98/45212 A1 | 10/1998 |
| WO | WO 03/020643 A1 | 3/2003 |

OTHER PUBLICATIONS

International Search Report (PCT/USA/220) issued in PCT/FR2004/00648.
Written Opinion of the International Searching Authority (PCT/ISA/237) issued in PCT/FR2004/00648.

* cited by examiner

*Primary Examiner* — Cam N. Nguyen
(74) *Attorney, Agent, or Firm* — Dentons US LLP

(57) ABSTRACT

The inventive composition, according to a first embodiment, consists essentially of a cerium oxide and a zirconium oxide in an atomic ratio Ce/Zr of at least 1. According to a second embodiment, said composition is based on cerium oxide, zirconium oxide with an atomic ratio Ce/Zr of at least 1 and at least one rare earth oxide other than cerium. After calcination at 1100° C., said composition has a specific surface of at least 9 m$^2$/g in the second embodiment. The inventive composition can be used as a catalyst especially for the treatment of waste gases from internal combustion engines.

23 Claims, No Drawings

COMPOSITIONS BASED ON CERIUM OXIDE, ZIRCONIUM OXIDE AND, OPTIONALLY, ANOTHER RARE EARTH OXIDE, HAVING A SPECIFIC RAISED SURFACE AT 1100° C, METHOD FOR THE PRODUCTION AND USE THEREOF AS A CATALYST

CROSS-REFERENCE TO PRIOR APPLICATIONS

This application is a continuation of U.S. patent application Ser. No. 10/549,531, filed Sep. 16, 2005, which is a national stage application of PCT/FR 2004/000648, filed Mar. 17, 2004, which claims the benefit of FR 03/03292, filed Mar. 18, 2003, the entire content of each earlier application hereby expressly incorporated by reference and each assigned to the assignee hereof.

The present invention relates to compositions based on cerium oxide, zirconium oxide and, optionally, another rare earth oxide, having a high specific surface area at 1100° C., to their method of preparation and to their use as a catalyst.

At the present time, catalysts called "multifunctional" catalysts are used for the treatment of exhaust gases from internal combustion engines (by automobile postcombustion catalysis). Multifunctional catalysts are understood to mean those capable of carrying out not only oxidation, in particular of carbon monoxide and the hydrocarbons present in exhaust gases, but also reduction, in particular of nitrogen oxides also present in these gases ("three-way" catalysts). Today, zirconium oxide and cerium oxide appear to be two particularly important and advantageous constituents for this type of catalyst. To be effective, these catalysts must have a high specific surface area even at high temperature.

There is a need for catalysts capable of being used at increasingly high temperatures and, for this to be so, having a specific surface area that is very stable.

The object of the invention is therefore the development of a catalytic composition that can meet this requirement.

For this purpose, and according to a first embodiment, the composition of the invention essentially consists of a cerium oxide and a zirconium oxide in a Ce/Zr atomic ratio of at least 1, and it is characterized in that it has a specific surface area of at least 9 m$^2$/g after calcination at 1100° C. for 4 hours.

According to a second embodiment, the composition of the invention is based on a cerium oxide, a zirconium oxide in a Ce/Zr atomic ratio of at least 1 and at least one oxide of a rare earth other than cerium, and it is characterized in that it has a specific surface area of at least 19 m$^2$/g after calcination at 1100° C. for 4 hours.

The invention also relates to a method of preparing such compositions, which is characterized in that it comprises the following steps:
(a) a mixture comprising a cerium compound, a zirconium compound and, if applicable, a compound of the aforementioned rare earth is formed;
(b) said mixture is brought into contact with a basic compound, by means of which a precipitate is obtained;
(c) said precipitate is heated in aqueous medium; then
(d) an additive, chosen from anionic surfactants, nonionic surfactants, polyethylene glycols, carboxylic acids and their salts, and surfactants of the carboxymethylated fatty alcohol ethoxylate type is added to the precipitate obtained in the previous step; and
(e) the precipitate thus obtained is calcined.

As was mentioned above, the compositions of the invention have high specific surface areas even after calcination at the high temperature of 1100° C.

Other features, details and advantages of the invention will become even more fully apparent on reading the following description, and from specific but nonlimiting examples intended to illustrate it.

As regards the rest of the description, the term "specific surface area" is understood to mean the BET specific surface area determined by nitrogen adsorption in accordance with the ASTM D 3663-78 standard established on the basis of the Brunauer—Emmett—Teller method described in the periodical *The Journal of the American Chemical Society*, 60, 309 (1938).

Furthermore, the calcinations after which the surface areas are given are calcinations in air.

The term "rare earth" is understood to mean the elements of the group consisting of yttrium and the elements of the Periodic Table having atomic numbers between 57 and 71 inclusive.

Unless otherwise indicated, the contents are given as oxides. The cerium oxide is in the form of ceric oxide.

It should be pointed out that, for the rest of the description, unless otherwise indicated, the limit values are included in the ranges of values given.

The compositions of the invention are in two embodiments that differ by the nature of their constituents. In the first embodiment, these compositions essentially consist of cerium oxide and zirconium oxide. By this it should be understood that the composition does not contain another oxide of another element, which may be a stabilizer for the surface area of said composition in the form of a rare earth other than cerium.

In the case of the first embodiment, the amount of cerium oxide in the composition is such that the Ce/Zr atomic ratio is at least 1, which corresponds to a proportion by weight of cerium oxide relative to the overall composition of at least 58%. This proportion may be more particularly between 58% and about 80% and even more particularly between 58% and about 70%.

As indicated above, the compositions according to this first embodiment after calcination at 1100° C. for 4 hours have a surface area that is at least 9 m$^2$/g. This surface area may more particularly be at least 10 m$^2$/g and even more particularly at least 15 m$^2$/g. Moreover, after calcination at 1200° C. for 4 hours, these same compositions may still have a specific surface area of at least 2 m$^2$/g, preferably at least 3 m$^2$/g and even more particularly at least 4 m$^2$/g.

These same compositions may also have a specific surface area of at least 45 m$^2$/g after calcination at 900° C. for 4 hours. Finally, they may have a specific surface area of at least 20 m$^2$/g, preferably at least 25 m$^2$/g, after calcination at 1000° C. for 4 hours.

In the case of the second embodiment of the invention, the compositions are based on cerium oxide, zirconium oxide and at least one oxide of a rare earth other than cerium. In this case, the compositions therefore contain at least three oxides and, more particularly, four. The rare earth other than cerium may especially be chosen from yttrium, lanthanum, neodymium and praseodymium and combinations thereof. Thus, mention may more particularly be made as compositions according to this second embodiment of those based on cerium oxide, zirconium oxide and lanthanum oxide, of those based on cerium oxide, zirconium oxide, lanthanum oxide and neodymium oxide and of those based on cerium oxide, zirconium oxide, lanthanum oxide and praseodymium oxide.

Still within the case of this second embodiment, the content of oxide of the rare earth other than cerium is generally at most 35%, especially at most 20%, by weight relative to the overall composition. This content may more particularly be at most 15% and even more particularly at most 10%. It is also usually at least 1% and more particularly at least 5%.

The respective cerium and zirconium contents in the compositions of this second type are such that the Ce/Zr atomic ratio is at least 1, which corresponds, as indicated above, to a proportion by weight of cerium oxide relative to the overall composition of at least 58%. This proportion may here be more particularly between 58% and about 90% and even more particularly between 58% and about 70%.

The compositions of the second embodiment have a specific surface area of at least 19 m$^2$/g after calcination at 1100° C. for 4 hours. This surface area may be more particularly at least 21 m$^2$/g.

Furthermore, after calcination at 1200° C. for 4 hours, these same compositions may still have a specific surface area of at least 3 m$^2$/g, preferably at least 4 m$^2$/g and even more particularly at most 6 m$^2$/g.

These same compositions may also have a specific surface area of at least 60 m$^2$/g, more particularly at least 65 m$^2$/g, after calcination at 900° C. for 4 hours. Finally, they may have a specific surface area of at least 35 m$^2$/g, preferably at least 40 m$^2$/g, after calcination at 1000° C. for 4 hours.

According to another feature, the compositions may advantageously be in the form of a solid solution. The X-ray diffraction spectra of these compositions reveal in this case, within the latter, the existence of a pure or homogeneous single phase. This phase in fact corresponds to a crystalline structure of the fluorite type, just like the crystallized ceric oxide $CeO_2$, the lattice parameters of which are somewhat shifted relative to a pure ceric oxide, thus reflecting the incorporation of the zirconium and, if applicable, the other rare earth into the crystal lattice of cerium oxide, and therefore the formation of a true solid solution. In the case of the compositions of the first embodiment, this pure phase is preserved up to a temperature of 1000° C. In the case of the compositions of the second embodiment, it is preserved up to a temperature of 1100° C.

The method of preparing the compositions of the invention will now be described.

This method is characterized in that it comprises the following steps:
  (a) a mixture comprising a cerium compound, a zirconium compound and, if applicable, a compound of the aforementioned rare earth is formed;
  (b) said mixture is brought into contact with a basic compound, by means of which a precipitate is obtained;
  (c) said precipitate is heated in aqueous medium; then
  (d) an additive, chosen from anionic surfactants, nonionic surfactants, polyethylene glycols glycols, carboxylic acids and their salts, and surfactants of the carboxymethylated fatty alcohol ethoxylate type is added to the precipitate obtained in the previous step; and
  (e) the precipitate thus obtained is calcined.

The first step (a) of the method therefore consists in preparing a mixture in a liquid medium of a zirconium compound, a cerium compound and optionally at least one compound of the additional aforementioned rare earth.

The mixing is generally carried out in a liquid medium, which is preferably water.

The compounds are preferably soluble compounds. These may especially be zirconium, cerium and lanthanide salts. These compounds may be chosen from nitrates, sulfates, acetates, chlorides and ceric ammonium nitrates.

As examples, mention may thus be made of zirconium sulfate, zirconyl nitrate or zirconyl chloride. Most generally, zirconyl nitrate is used. Mention may also be especially be made of cerium (IV) salts such as, for example, nitrates or ceric ammonium nitrates, which are particularly suitable here. Ceric nitrate is preferably used. It is advantageous to use salts with a purity of at least 99.5% and more particularly at least 99.9%. An aqueous ceric nitrate solution may for example be obtained by the reaction of nitric acid on a hydrated ceric oxide prepared conventionally by reacting a solution of a cerous salt, for example cerous nitrate, with an ammonia solution in the presence of hydrogen peroxide. It is also possible preferably to use a ceric nitrate solution obtained by the method of electrolytic oxidation of a cerous nitrate solution, as described in the document FR-A-2 570 087, which constitutes here an advantageous raw material.

It should be noted here that the aqueous solutions of cerium salts and zirconyl salts may have a certain initial free acidity, which can be adjusted by the addition of a base or an acid. However, it is equally possible to employ an initial solution of cerium and zirconium salts having actually a certain free acidity as mentioned above and solutions that will have been neutralized beforehand to a greater or lesser extent. This neutralization may be carried out by the addition of a basic compound to the aforementioned mixture so as to limit this acidity. This basic compound may for example be an ammonia solution or a solution of alkali metal (sodium, potassium, etc.) hydroxides, but preferably an ammonia solution.

Finally, it should be noted that, when the starting mixture contains cerium in the (III) form, it is preferable to employ, during the method, an oxidizing agent, for example hydrogen peroxide. This oxidizing agent may be used by being added to the reaction mixture during step (a) or during step (b), especially at the end of the latter step.

It is also possible to use a sol as starting compound of zirconium or cerium. The term "sol" denotes any system consisting of fine solid particles of colloidal dimensions, that is to say dimensions of between about 1 nm and about 500 nm, based on a zirconium or cerium compound, this compound generally being a zirconium or cerium oxide and/or hydrated oxide, in suspension in an aqueous liquid phase, said particles furthermore optionally being able to contain residual amounts of bonded or adsorbed ions, such as for example nitrate, acetate, chloride or ammonium ions. It should be noted that, in such a sol, the zirconium or cerium may be either completely in the form of colloids, or simultaneously in the form of ions and in the form of colloids.

It does not matter whether the mixture is obtained from compounds initially in the solid state, which will subsequently be introduced into an aqueous stock for example, or directly from solutions of these compounds, said solutions then being mixed in any order.

In the second step (b) of the method, said mixture is brought into contact with a basic compound. As base or basic compound, it is possible to use products of the hydroxide type. Mention may be made of alkali metal or alkaline-earth metal hydroxides. It is also possible to use secondary, tertiary or quaternary amines. However, amines and aqueous ammonia may be preferred in so far as they reduce the risks of contamination by alkali metal or alkaline-earth metal cations. Mention may also be made of urea.

The way in which the mixture and the solution are brought into contact with each other, that is to say the order of introduction thereof, is not critical. However, this contacting may be carried out by introducing the mixture into the solution of the basic compound. This variant is preferable in order to obtain compositions in the form of solid solutions.

The contacting or the reaction between the mixture and the solution, especially the addition of the mixture into the solution of the basic compound, may be carried out in a single step, gradually or continuously, and it is preferably performed with stirring. It is preferably carried out at room temperature.

The next step (c) of the method is the step of heating the precipitate in aqueous medium.

This heating may be carried out directly on the reaction mixture obtained after reaction with the basic compound or on a suspension obtained after separating the precipitate from the reaction mixture, optionally washing it and putting it back into water. The temperature at which the medium is heated is at least 100° C. and even more preferably at least 130° C. The heating operating may be carried out by introducing the liquid medium into a sealed chamber (a closed reactor of the autoclave type). Under the temperature conditions given above, and in aqueous medium, it may thus be specified, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating may also be carried out in an open reactor for temperatures close to 100° C.

The heating may be carried out either in air or in an inert gas atmosphere, preferably in nitrogen.

The duration of the heating may vary widely, for example between 1 and 48 hours, preferably between 2 and 24 hours. Likewise, the rate at which the temperature rises is not critical—it is thus possible to reach the fixed reaction temperature by heating the medium for example between 30 minutes and 4 hours, these values being given merely by way of indication.

The heated medium generally has a pH of at least 5. Preferably, this pH is basic, that is to say it, is greater than 7 and more particularly at least 8.

It is possible to carry out several heating operations. Thus, the precipitate obtained after the heating step and optionally a washing operation may be resuspended in water and then another heating operation may be carried out on the medium thus obtained. This other heating operation is carried out under the same conditions as those described for the first one.

The next step (d) of the method consists in adding, to the precipitate obtained after the preceding step, an additive that is chosen from anionic surfactants, nonionic surfactants, polyethylene glycols, and carboxylic acids and their salts.

As regards this additive, reference may be made to the teaching of Application WO-98/45212 and the surfactants described in that document may be used.

Mention may be made, as surfactants of the anionic type, of ethoxycarboxylates, ethoxylated fatty acids, sarcosinates, phosphate esters, sulfates such as alcohol sulfates, alcohol ether sulfates and sulfated alkanolamide ethoxylates, sulfonates such as sulfosuccinates, alkylbenzenesulfonates or alkylnaphthalenesulfonates.

As nonionic surfactants, mention may be made of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may be made in particular of the products sold under the brand names IGEPAL®, DOWANOL®, RHODAMOX® and ALKAMIDE®.

As regards carboxylic acids, it is possible to use in particular aliphatic monocarboxylic or dicarboxylic acids and, among these, saturated acids may more particularly be used. Use may also be made of fatty acids and more particularly of saturated fatty acids. Thus, mention may especially be made of formic, acetic, propionic, butyric, isobutyric, valeric, caproic, caprylic, capric, lauric, myristic and palmitic acids. As dicarboxylic acids, mention may be made of oxalic, malonic, succinic, glutaric, adipic, pimelic, suberic, azelaic and sebacic acids.

The salts of carboxylic acids may also be used, especially ammoniacal salts.

As an example, mention may more particularly be made of lauric acid and ammonium laurate.

Finally, it is possible to use a surfactant chosen from those of the carboxymethylated fatty alcohol ethoxylate type.

The term "product of the carboxymethylated fatty alcohol ethoxylate type" is understood to mean products composed of ethoxylated or propoxylated fatty alcohols having a $CH_2$—COOH group at the chain end.

These products may correspond to the formula:

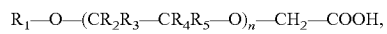

$$R_1\text{—O—}(CR_2R_3\text{—}CR_4R_5\text{—O})_n\text{—}CH_2\text{—COOH},$$

in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and represent hydrogen or else $R_2$ may represent a $CH_3$ group and $R_3$, $R_4$ and $R_5$ represent hydrogen; n is a nonzero integer that can range up to 50 and more particularly is between 5 and 15, these values being inclusive. It should be noted that a surfactant may consist of a mixture of products of the above formula in which $R_1$ may be saturated and unsaturated respectively or else products comprising both —$CH_2$—$CH_2$—O— and —$C(CH_3)$—$CH_2$—O— groups.

The addition of the surfactant may be carried out in two ways. It may be added directly to the suspension of precipitate obtained from the preceding heating step (c).

It may also be added to the solid precipitate after this has been separated by any known means from the medium in which the heating took place.

The amount of surfactant used, expressed as a percentage by weight of additive relative to the weight of the composition calculated as oxide, is generally between 5% and 100%, more particularly between 15% and 60%.

According to an alternative way of implementing the method, it is possible to carry out a moderate-energy milling operation on the precipitate in suspension, by subjecting this suspension to a shearing action, for example using a colloid mill or a turbine agitator.

In a final step of the method according to the invention, the recovered precipitate is then calcined. This calcination allows the crystallinity of the product formed to be increased, and it may also be adjusted and/or chosen depending on the subsequent use temperature reserved for the composition according to the invention, taking into account the fact that the specific surface area of the product is lower the higher the calcination temperature employed. Such a calcination is generally carried out in air, but a calcination carried out for example in an inert gas or in a controlled (oxidizing or reducing) atmosphere is of course not excluded.

In practice, the calcination temperature is generally limited to a range of values between 300 and 1000° C.

The compositions of the invention, as described above or as obtained in the method studied above, are in the form of powders, but they may optionally be formed into granules, beads, cylinders or honeycombs of varying dimensions.

The compositions of the invention may be used as catalysts or as catalyst supports. Thus, the invention also relates to catalytic systems comprising the compositions of the invention. For such systems, these compositions may be applied to any support normally used in the catalysis field, that is to say, in particular, thermally inert supports. This support may be chosen from alumina, titanium oxide, cerium oxide, zirconium oxide, silica, spinels, zeolites, silicates, crystalline silicon aluminum phosphates and crystalline aluminum phosphates.

The compositions may also be used in catalytic systems including a wash coat having catalytic properties and based on these compositions, on a substrate for example of the metal or ceramic monolith type. The wash coat may itself include a support of the type of those mentioned above. This wash coat is obtained by mixing the composition with the support so as to form a suspension that may then be deposited on the substrate.

These catalytic systems, and more particularly the compositions of the invention, may have very numerous applications. They are thus particularly well suited to, and therefore usable in, the catalysis of various reactions such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination and dehydrocyclization of hydrocarbons or other organic compounds, oxidation and/or reduction reactions, the Claus reaction, the treatment of internal combustion exhaust gases, demetalization, methanation, shift conversion, catalytic oxidation of soot emitted by internal combustion engines, such as diesel or petrol engines operating in lean mode. Finally, the catalytic systems and the compositions of the invention may be used as NOx traps.

In the case of these uses in catalysis, the compositions of the invention are employed in combination with precious metals, said compositions thus acting as support for these metals. The nature of these metals and the techniques of incorporating them into support compositions are well known to those skilled in the art. For example, the metals may be platinum, rhodium, palladium or iridium, and they may especially be incorporated into the compositions by, impregnation.

Among the uses mentioned, the treatment of internal combustion engine exhaust gases (by automobile postcombustion catalysis) constitutes one particularly advantageous application. Consequently, the invention also relates to a method of treating the exhaust gases of internal combustion engines, which is characterized in that a catalytic system as described above or a composition according to the invention and as described above is used as catalyst.

Examples will now be given.

EXAMPLE 1

This example relates to the preparation of a composition based on cerium oxide and zirconium oxide in respective proportions by weight of 58/42.

Introduced into a stirred beaker were 525 ml of zirconium nitrate (80 g/l) and 230 ml of ceric nitrate ($Ce^{4+}$=236.5 g/l; $Ce^{3+}$=15.5 g/l; and free acid=0.7N). Distilled water was then added so as to obtain 1 liter of a solution of nitrates.

Introduced into a stirred round-bottomed reactor were 253 ml of an aqueous ammonia solution and distilled water was then added so as to obtain a total volume of 1 liter.

The solution of nitrates was introduced over 1 hour into the reactor with constant stirring.

The solution obtained was placed in a stainless steel autoclave fitted with a stirrer. The temperature of the medium was raised to 150° C. over 2 hours with stirring.

The suspension this obtained was then filtered on a Büchner funnel. A precipitate containing 23.4% oxide by weight was recovered.

100 g of this precipitate were taken.

In parallel, an ammonium laurate gel was prepared under the following conditions: 250 g of lauric acid were introduced into 135 ml of aqueous ammonia (12 mol/l) and 500 ml of distilled water, and then the mixture was homogenized using a spatula.

28 g of this gel were added to 100 g of the precipitate and the combination was then mixed until a uniform paste was obtained.

The product obtained was then heated to 650° C. for 2 hours in stages.

Indicated below are the surface areas obtained after subsequent calcinations at various temperatures:

4 h at 900° C.: 49 $m^2/g$;
4 h at 1000° C.: 31 $m^2/g$;
4 h at 1100° C.: 15 $m^2/g$;
10 h at 1200° C.: 4 $m^2/g$.

EXAMPLE 2

This example relates to the preparation of a composition based on cerium, zirconium, lanthanum and praseodymium oxides in the respective proportions by weight of 60%, 30%, 3% and 7%.

Introduced into a stirred beaker were 375 ml of zirconium nitrate (80 g/l), 121 ml of cerium nitrate in the oxidation state III (496 g/l), 6.6 ml of lanthanum nitrate (454 g/l) and 14 ml of praseodymium nitrate (500 g/l). Distilled water was then added so as to obtain 1 liter of a solution of nitrates.

Introduced into a stirred round-bottomed reactor were 200 ml of an aqueous ammonia solution (12 mol/l), 302 ml of hydrogen peroxide (110 volumes) and distilled water was then added so as to obtain a total volume of 1 liter.

The procedure then continued as in Example 1, and the suspension obtained after the autoclave treatment was then filtered on a Büchner funnel. A precipitate containing 30.5% oxide by weight was recovered.

100 g of this precipitate were taken and 36.5 g of an ammonium laurate gel was added to them, said gel being prepared as in Example 1, until a uniform paste was obtained.

The product obtained was then heated to 650° C. for 2 hours in stages.

Indicated below are the surface areas obtained after subsequent calcinations at various temperatures:

4 h at 900° C.: 65 $m^2/g$;
4 h at 1000° C.: 42 $m^2/g$;
4 h at 1100° C.: 23 $m^2/g$;
10 h at 1200° C.: 4 $m^2/g$.

What is claimed is:

1. A composition consisting essentially of a cerium oxide and a zirconium oxide in a Ce/Zr atomic ratio of at least 1, said composition having a specific surface area of at least 45 $m^2/g$ after calcination at 900° C. for 4 hours; of at least 20 $m^2/g$ after calcination at 1000° C. for 4 hours and of at least 9 $m^2/g$ after calcination at 1100° C. for 4 hours.

2. The composition as defined by claim 1, having a specific surface area of at least 15 $m^2/g$ after calcination at 1100° C. for 4 hours.

3. The composition as defined by claim 1, having a specific surface area of at least 2 $m^2/g$, after calcination at 1200° C. for 4 hours.

4. The composition as defined by claim 3, wherein the specific surface area is of at least 3 $m^2/g$.

5. The composition as defined by claim 3, wherein the specific surface area is of at least 4 $m^2/g$.

6. A method of preparing a composition as claimed in claim 1, comprising the steps of:

(a) forming a mixture comprising a cerium compound, a zirconium compound and, optionally, a compound of a rare earth other than cerium, selected from the group consisting of yttrium, lanthanum, neodymium and praseodymium;
(b) bringing said mixture into contact with a basic compound, to obtain a precipitate;
(c) heating said precipitate in an aqueous medium;
(d) adding an additive, selected from the group consisting of anionic surfactants, nonionic surfactants, polyethylene glycols, carboxylic acids, the salts of carboxylic acids, and carboxymethylated fatty alcohol ethoxylate surfactants, to the precipitate obtained in the previous step; and, then
(e) calcining the precipitate obtained in step (d).

7. The method as claimed in claim 6, wherein, the zirconium compound, cerium compound and compound of the rare earth, is selected from the group consisting of nitrates, acetates, chlorides and ceric ammonium nitrates.

8. The method as claimed in claim 6, wherein, in the mixture of step (a), the cerium compound is in the Ce(III) form and an oxidizing agent is added during step (a) or during step (b).

9. The method as claimed in claim 8, wherein the oxidizing agent is added at the end of step (b).

10. The method as claimed in claim 6, wherein the precipitate is heated in step (c) to a temperature of at least 100° C.

11. A catalytic system, comprising a composition as claimed in claim 1.

12. A method of automobile postcombustion catalysis of exhaust gases of an internal combustion engine, said method comprising the step of treating said exhaust gases with a catalytic system as claimed in claim 11.

13. A composition based on a cerium oxide, a zirconium oxide in a Ce/Zr atomic ratio of at least 1 and at least one oxide of a rare earth other than cerium, having a specific surface area of at least 19 $m^2/g$ after calcination at 1100° C. for 4 hours.

14. The composition as defined by claim 13, wherein the rare earth other than cerium is selected from the group consisting of yttrium, lanthanum, neodymium and praseodymium.

15. The composition as defined by claim 14, wherein the oxide of a rare earth other than cerium is present in the composition in an amount of at least 20% by weight.

16. The composition as defined by claim 13, said composition having a specific surface area of at least 60 $m^2/g$ after calcination at 900° C. for 4 hours and of at least 21 $m^2/g$ after calcination at 1100° C. for 4 hours.

17. The composition as defined by claim 13, wherein the specific surface area is of at least 6 $m^2/g$.

18. The composition as defined by claim 13, wherein the composition has a specific surface area of at least 3 $m^2/g$ after calcination at 1200° C. for 4 hours.

19. The composition as defined by claim 13, wherein the composition has a specific surface area of at least 4 $m^2/g$ after calcination at 1200° C. for 4 hours.

20. The composition as defined by claim 13, wherein the composition has a specific surface area of at least 21 $m^2/g$ after calcination at 1100° C. for 4 hours.

21. A composition consisting essentially of a cerium oxide and a zirconium oxide in a Ce/Zr atomic ratio of at least 1, said composition having a specific surface area of at least 15 $m^2/g$ after calcination at 1100° C. for 4 hours.

22. A composition comprising a cerium oxide, a zirconium oxide in a Ce/Zr atomic ratio of at least 1 and at least one oxide of a rare earth other than cerium, the composition having a specific surface area of at least 35 $m^2/g$ after calcination at 1000° C. for 4 hours and a specific surface area of at least 19 $m^2/g$ after calcination at 1100° C. for 4 hours.

23. The composition as defined by claim 22, wherein the composition has a specific surface area of at least 40 $m^2/g$ after calcination at 1000° C. for 4 hours.

* * * * *

UNITED STATES PATENT AND TRADEMARK OFFICE
CERTIFICATE OF CORRECTION

PATENT NO. : 8,460,626 B2
APPLICATION NO. : 12/977236
DATED : June 11, 2013
INVENTOR(S) : Olivier Larcher and Emannual Rohart It is certified that error appears in the above-identified patent and that said Letters Patent is hereby corrected as shown below:

Title page, item 63 (Related U.S. Application Data): insert --filed Sep. 16, 2005, which is a national stage application of-- after "10/549,531," and delete "No." before "PCT/FR 2004/000648".

Title page, item 63 should then state:

Continuation of application No. 10/549,531, filed Sep. 16, 2005, which is a national stage application of PCT/FR 2004/000648, filed Mar. 17, 2004, now abandoned.

Signed and Sealed this
Thirteenth Day of August, 2013

Teresa Stanek Rea
*Acting Director of the United States Patent and Trademark Office*